US012703661B2

(12) United States Patent
Jane et al.

(10) Patent No.: US 12,703,661 B2
(45) Date of Patent: Aug. 11, 2026

(54) COATED ARTICLES WITH A LOW-E COATING

(71) Applicants: UNIVERSITY OF SOUTH AUSTRALIA, Adelaide (AU); MALAYSIA AUTOMOTIVE ROBOTICS AND IOT INSTITUTE, Cyberjaya Selangor (MY)

(72) Inventors: Marta Llusca Jane, North Adelaide (AU); Aleksandra Pajak, Kunow (PL); Kamil Zuber, Salisbury Downs (AU); Eliza Switalska, Semaphore Park (AU); Peter J. Murphy, Flagstaff Hill (AU)

(73) Assignees: ADELAIDE UNIVERSITY, Adelaide (AU); MALAYSIA AUTOMOTIVE ROBOTICS AND IOT INSTITUTE, Cyberjaya (MY)

( * ) Notice: Subject to any disclaimer, the term of this patent is extended or adjusted under 35 U.S.C. 154(b) by 0 days.

(21) Appl. No.: 18/870,668

(22) PCT Filed: May 31, 2023

(86) PCT No.: PCT/AU2023/050471
§ 371 (c)(1),
(2) Date: Nov. 30, 2024

(87) PCT Pub. No.: WO2023/230664
PCT Pub. Date: Dec. 7, 2023

(65) Prior Publication Data

US 2025/0340482 A1 Nov. 6, 2025

(30) Foreign Application Priority Data

May 31, 2022 (AU) ................................ 2022901475

(51) Int. Cl.
*B32B 3/08* (2006.01)
*B32B 3/10* (2006.01)
(Continued)

(52) U.S. Cl.
CPC .............. *C03C 17/366* (2013.01); *B32B 3/08* (2013.01); *B32B 3/10* (2013.01); *C03C 17/3644* (2013.01);
(Continued)

(58) Field of Classification Search
CPC .... B32B 3/00; B32B 3/02; B32B 3/08; B32B 3/10; B32B 3/18; B32B 3/22;
(Continued)

(56) References Cited

U.S. PATENT DOCUMENTS 5,800,933 A 9/1998 Hartig et al.
6,602,608 B2 * 8/2003 Stachowiak .......... C23C 14/085 428/428
2020/0350980 A1 * 11/2020 Rofougaran .......... H04W 16/28

FOREIGN PATENT DOCUMENTS

CN 102501448 A 6/2012
CN 104354361 A 2/2015
WO 2019157798 A1 8/2019

OTHER PUBLICATIONS

KR 2011-0113879 (Year: 2011).*

* cited by examiner

*Primary Examiner* — Elizabeth E Mulvaney
(74) *Attorney, Agent, or Firm* — Workman Nydegger

(57) ABSTRACT

The present disclosure relates to coated articles with a low-E coating and their preparation methods. The coated article comprises a low-E coating which is supported by a substrate
(Continued)

and comprises a metallic IR reflective layer, a protective layer in contact with the metallic IR reflective layer, and a dielectric layer.

19 Claims, 4 Drawing Sheets

(51) Int. Cl.
*C03C 17/36* (2006.01)
*B32B 17/06* (2006.01)

(52) U.S. Cl.
CPC ...... *C03C 17/3649* (2013.01); *C03C 17/3668* (2013.01); *C03C 17/3681* (2013.01); *B32B 17/06* (2013.01); *C03C 2217/212* (2013.01); *C03C 2217/256* (2013.01)

(58) Field of Classification Search
CPC .............. B32B 17/06; B32B 17/10036; B32B 17/10174; B32B 17/10183; B32B 17/10192
See application file for complete search history.

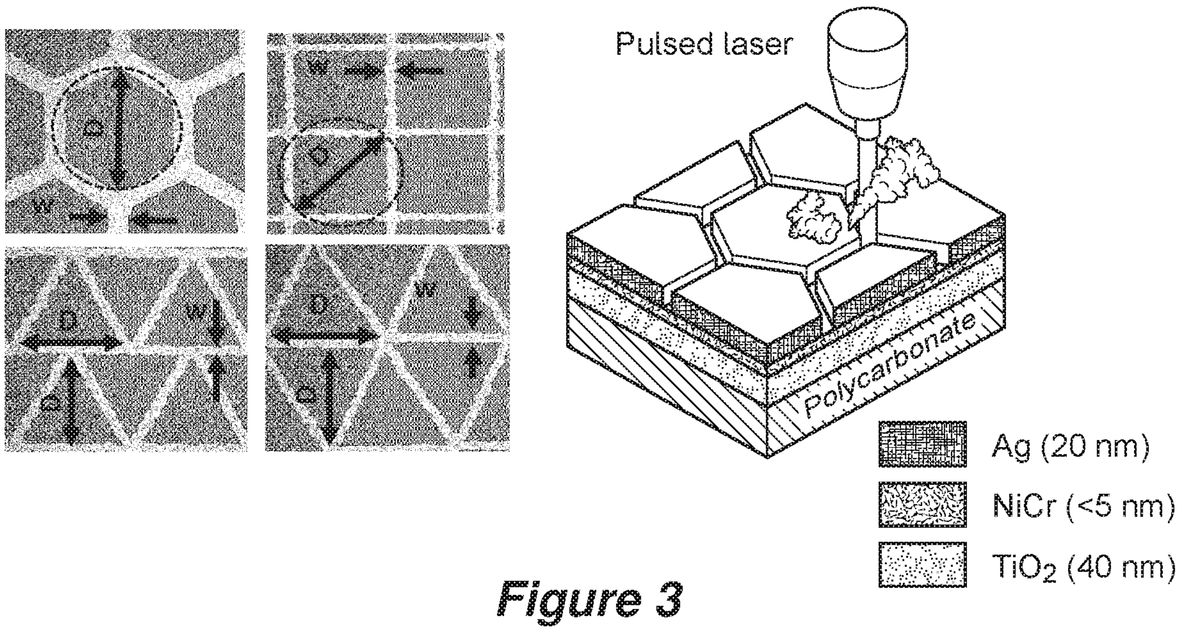
Figure 3
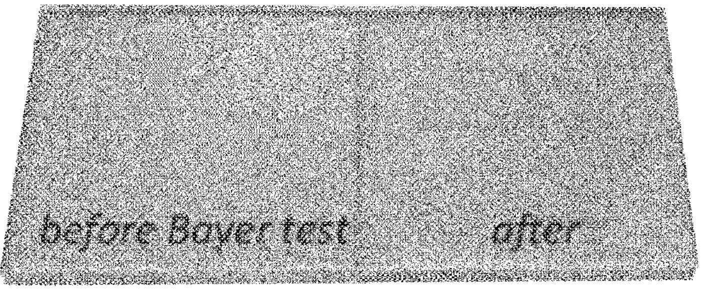
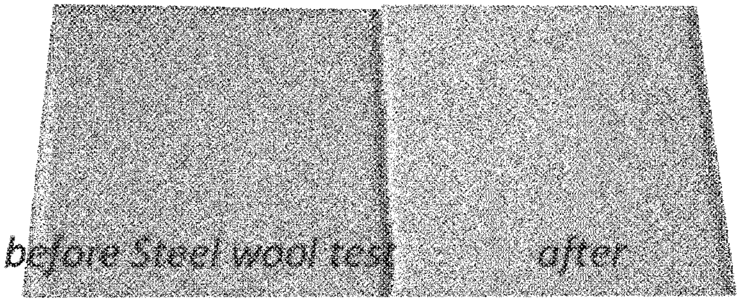
Figure 4

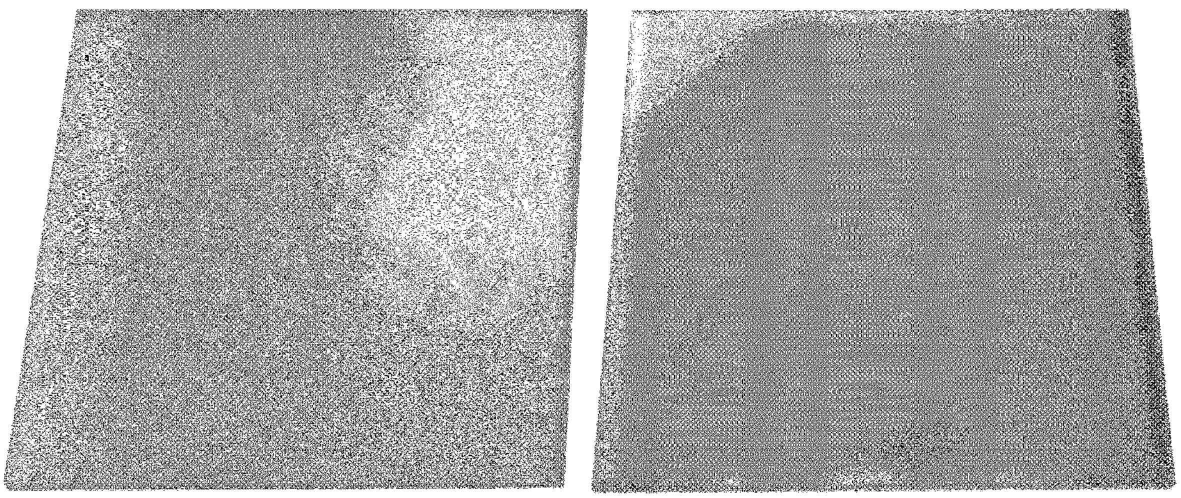
*Figure 5A* *Figure 5B*
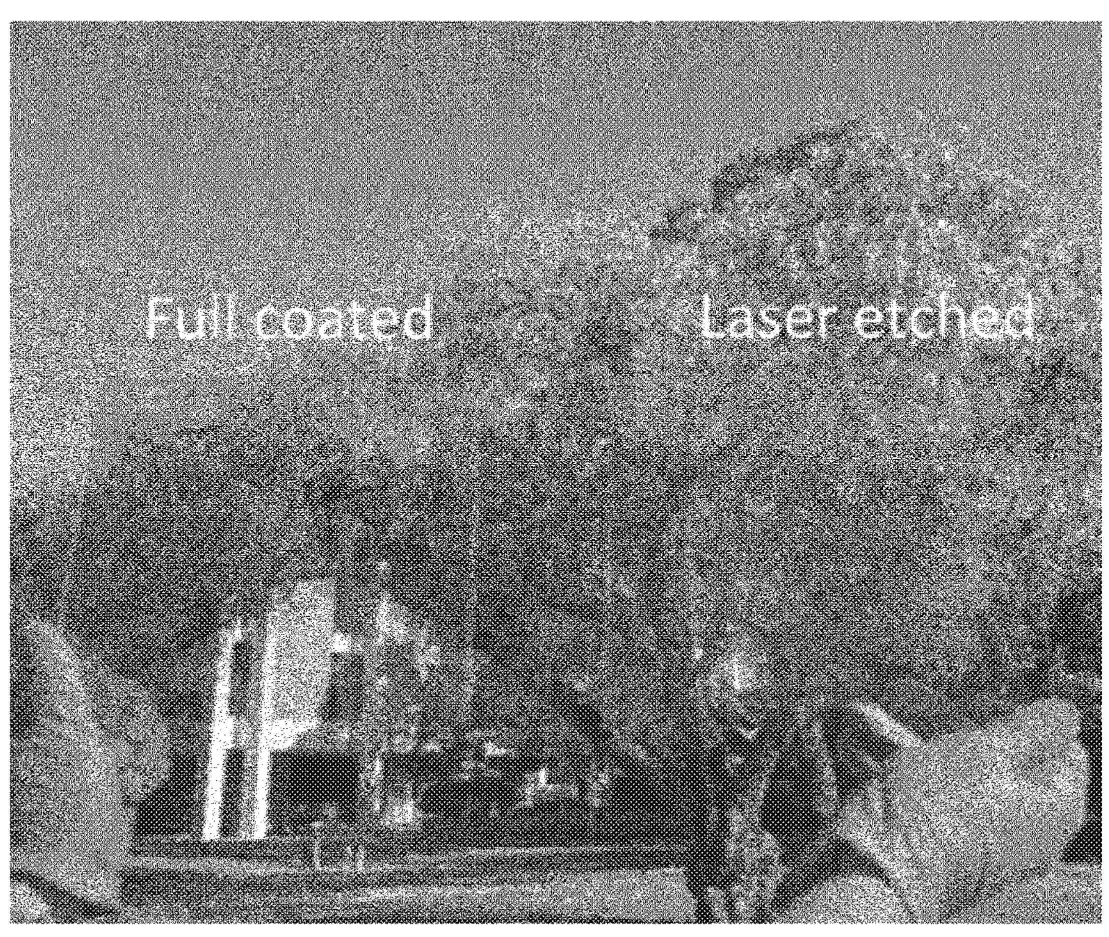
*Figure 6*

COATED ARTICLES WITH A LOW-E COATING

PRIORITY DOCUMENT

The present application claims priority from Australian Provisional Patent Application No. 2022901475 titled "COATED ARTICLES WITH A LOW-E COATING AND/OR A HARD COAT" and filed on 31 May 2022, the content of which is hereby incorporated by reference in its entirety.

TECHNICAL FIELD

The present disclosure generally relates to coated articles and methods for their preparation. In a particular form, the present disclosure relates to coated articles with a low-E coating and methods for their preparation.

BACKGROUND

A low emissivity (low-E) coating comprises a stack of very thin films that reflect solar infrared radiation and allow some of the visible light to pass through. Low-E coatings find applications in architectural glazing, automotive windows, and on solar thermal collectors due to their good energy saving performance. The capability of low-e articles (such as windows) to reflect solar infrared yields a significant reduction of the indoor building temperature in summer, and maintains the indoor heat in winter, thus, minimising the use of air-conditioning and heating systems respectively. In addition, their high transmittance in the visible range greatly contributes to a reduction of artificial lighting during daylight hours.

To achieve this combination of reflectivity and transmittance, a low-E coating typically comprises conductive metallic layers and dielectric layers. In some circumstances, a multi-layer system of dielectric material(s)-silver-dielectric material(s) is used, wherein a thin layer (~10 nm) of silver reflects long wavelength IR and the dielectric layers both protect the silver and provide anti-reflection functions. Common examples of dielectric materials include $TiO_2$, $SnO_2$ or ZnO, and they are typically deposited by magnetron sputtering.

For architectural windows, most commonly used coatings are low-E coatings. These do reflect the heat due to their metallic content and are highly transparent, but they are made of a rather complex structure, in which usually more than 20 layers and 10 different materials are involved, leading to an expensive manufacturing process. In addition, commercial low-E coatings suffer from durability issues due to corrosion at the IR reflective layer(s) that are usually made of silver (Ag), and therefore they are often placed inside the cavity between double pane windows in order to be protected from weathering.

Traditionally in the automotive industry, glass panes with an adhesive window tint that consists of one or more PET sheet which contains carbon, ceramic nanoparticles or a dark dye are used to darken windows in order to block IR radiation from the sun. However, these tints absorb the IR radiation instead of reflecting it. This means that the absorbed radiation is re-radiated back into a car by means of conduction and convection, hence, not protecting the car from the heat. In addition, they present low visible transmittance for an efficient heat blocking, thus, are not suitable for public transport or vehicle windscreens.

Another disadvantage of existing low-E coatings is that the thin metallic layer(s) attenuate(s) microwave and radiofrequency signals, especially high frequency ranges such as 5G wireless signals (600 MHz~100 GHz). For instance, if an automobile is equipped with metallic-based low-E windows, it will act as a Faraday cage and reflect or attenuate dramatically the useful telecommunication signals. With the evolution of wireless devices, it is also important to have a strong and steady signal strength inside buildings. The attenuation of the signal through an object is also measured by shielding effectiveness (SE). The shielding effectiveness is defined as the logarithm of the ratio of the magnitude of an incident electric field to the magnitude of the transmitted electric field and is expressed in decibels (dB). 0 dB means there is no attenuation. A current strategy to amplify the signal, for example, in public transport, is the installation of a repeater device. But this type of device only amplifies selected frequencies and needs to be replaced when the communication standards change. These are expensive and energy consuming. Another option is the use of ultra-wideband antennas, but their performance depends on the mounting location on the vehicle's body and the distance between the metallic window and the antenna can drastically reduce their efficiency. Antennas can also be integrated into heated windows. However, these will only cover the FM/TV range (50-800 MHZ). The latest integrated window antenna can cover 4G LTE and low frequency 5G signals, however, these also need to be replaced when communication standards change.

Articles (for example, windows and doors) having low-E coatings tend to be exposed to harsh and extreme conditions in practical applications and thus the resistance to weathering, robustness and durability are critical. In the circumstances that a plastic substrate rather than a glass substrate is used in automotive, transportation or architectural industries, the substrate may be prone to turn yellow and lose clarity upon UV exposure. To deal with these issues, a plastic substrate (e.g. polycarbonate) is usually protected with liquid applied coatings (resins), the outermost of which are also typically hard coatings. For example, commercial polycarbonates may have a primer resin and a hard coat applied thereon, wherein the primer acts as an adhesive layer between the hard coat and the bare polycarbonate substrate.

There remains a need for coated articles and methods for their preparation that may alleviate or mitigate one or more of the above problems. In other words, it would be desirable for a coated article to have a simplified low-cost structure while preserving comparable transmittance of visible light and reflectivity of IR radiation to those of existing commercial products. In addition, or alternatively, it would be desirable for a coated article to have lower attenuation of the signal transmission of telecommunication frequencies. In addition, or alternatively, it would be desirable for a coated article to have improved durability and resistance to abrasion and weathering.

SUMMARY

According to a first aspect, there is provided a coated article comprising a low-E coating supported by a substrate, wherein the low-E coating comprises a metallic IR reflective layer, a protective layer in contact with the metallic IR reflective layer, and a dielectric layer.

In some embodiments, the coated article has a thermal emissivity & of about $0.04<\varepsilon<$about 0.4, for example, about $0.04<\varepsilon<$about 0.3, if desired, about $0.04<\varepsilon<$about 0.2. In some further embodiments, the coated article has a visible transmittance of >about 60%, preferably >about 70%, more preferably >about 80% and/or an IR reflectance of >about 60%, preferably >about 70%. In even further embodiments, the low-E coating supported by the substrate has a total thickness in the range of about 90 nm to about 120 nm.

In some embodiments, the metallic IR reflective layer comprises silver (Ag), gold (Au), copper (Cu), aluminium (Al), zinc (Zn), niobium (Nb), titanium nitride (TiN), Ag/Au alloys, Ag/Cu alloys, Ag/Al alloys, $NbN_x$, NbCr, $NbCrN_x$, and/or $NbZrO_x$. Silver (Ag), gold (Au) or copper (Cu) may be particularly suitable for the metallic IR reflective layer. In some further embodiments, the low-E coating comprises one metallic IR reflective layer. In even further embodiments, the metallic IR reflective layer has a thickness of about 5 nm to about 25 nm, preferably about 10 nm to about 20 nm.

In some embodiments, the protective layer in contact with the metallic IR reflective layer comprises nickel-chromium alloys (NiCr), $NiCrN_x$, Ni, Cr, $NiCrO_x$, $NiCrO_xN_y$, $Ni_xTi_yO_z$, $CrN_x$, $NiO_x$, Ti, $TiO_x$, $NbO_x$, ZnO, $Al_2O_3$, and/or $ZnAlO_x$. NiCr, $NiCrN_x$, Ni or Cr may be particularly suitable for the protective layer. In some further embodiments, a metallic IR reflective layer is sandwiched between two adjacent protective layers. In even further embodiments, the protective layer has a thickness of about 1 nm to about 5 nm, preferably about 2 nm to about 3 nm.

In some embodiments, the low-E coating comprises one or more dielectric layer. In some embodiments, the dielectric layer comprises one or more transparent material selected from the group consisting of $TiO_2$, $Ta_2O_5$, $Nb_2O_5$, $ZrO_2$, ZnO, ZnS, ZnSe, $HfO_2$, $LaTiO_3$, $Al_2O_3$, $La_2O_3$, $Y_2O_3$, $Gd_2O_3$, $Sc_2O_3$, $Si_3N_4$, $SiO_2$, LiF, $MgF_2$, $Na_3AlF_6$, $SnO_2$, indium tin oxide (ITO), Al-doped zinc oxide (AZO), Al-doped $SiO_2$, $WO_3$, $SiAlO_xN_y$ and $SiO_xN_y$. In some further embodiments, the dielectric layer comprises one or more material selected from the group consisting of $TiO_2$, $Nb_2O_5$ and $Ta_2O_5$. In some further embodiments, each of the dielectric layers has a thickness of from about 10 nm to about 45 nm, for example about 25 nm to about 45 nm.

In some embodiments, a metallic IR reflective layer is sandwiched between two adjacent protective layers, each of the protective layers comprises NiCr and is about <5 nm thick, the metallic IR reflective layer comprises Ag and is about 20 nm thick.

In some embodiments, the coated article comprises a low-E coating supported by a substrate, and the low-E coating comprises, in order outward from the substrate, a dielectric layer comprising $TiO_2$, a protective layer comprising NiCr, a metallic IR reflective layer comprising Ag, a protective layer comprising NiCr, and a dielectric layer comprising $TiO_2$. In some further embodiments, the coated article comprises a low-E coating supported by a substrate, and the low-E coating comprises, in order outward from the substrate, a dielectric layer of $TiO_2$ that is about 25 nm to about 45 nm, a protective layer of NiCr that is about <5 nm, a metallic IR reflective layer of Ag that is about 10 nm to about 20 nm, a protective layer of NiCr that is about <5 nm, and a dielectric layer of $TiO_2$ that is about 25 nm to about 45 nm. In even further embodiments, the coated article comprises a low-E coating supported by a substrate, and the low-E coating comprises, in order outward from the substrate, a dielectric layer of $TiO_2$ that is about 40 nm, a protective layer of NiCr (80/20) that is about <5 nm, a metallic IR reflective layer of Ag that is about 20 nm, a protective layer of NiCr (80/20) that is about <5 nm, and a dielectric layer of $TiO_2$ that is about 40 nm. In even further embodiments, the coated article comprises a low-E coating directly supported by a substrate, and the low-E coating comprises, in order outward from the substrate, a dielectric layer of $TiO_2$ that is about 40 nm, a protective layer of NiCr (80/20) that is about <5 nm, a metallic IR reflective layer of Ag that is about 20 nm, a protective layer of NiCr (80/20) that is about <5 nm, a dielectric layer of $TiO_2$ that is about 40 nm, and a dielectric/adhesive layer of $SiO_2$ or Al-doped $SiO_2$ that is about 10 nm.

In some embodiments, the coated article comprises a hard coat as an outermost layer. In some embodiments, the metallic IR reflective layer comprises a frequency selective surface configured to reduce attenuation of telecommunication frequency signal transmission.

In some embodiments, the substrate for the coated article is substantially made from plastic or glass, which may be flexible or rigid. In some specific embodiments, the plastic used for the substrate is selected from the group consisting of polycarbonate, polyethylene, polypropylene, ploymethylmethacrylate, polystyrene, polyamide, polyester, polyestercarbonate, polyethersulfone, polyethylene terephthalate (PET), polyethylene naphthalate (PEN), polyethylene terephthalate glycol (PETG), acrylonitrile butadiene styrene (ABS), acrylonitrile styrene acrylate (ASA), polymethyl methacrylate (PMMA) and polyetherimide. In some further embodiments, the glass used for the substrate is selected from the group consisting of borosilicate glass, flat glass, quartz glass, and soda lime (float) glass. In certain embodiments, the coated article has no between-pane space and the low-E coating is applied onto at least part of a surface of the substrate that will be exposed to a use environment. In some further embodiments, the substrate for the coated article has a thickness of about 0.4 cm to about 0.5 cm.

In some embodiments, the coated article is selected from the group consisting of windows, doors and windscreens.

According to a second aspect, there is provided a method for preparing the coated article of the first aspect, which includes introducing the dielectric layer, the protective layer in contact with the metallic IR reflective layer, and the metallic IR reflective layer onto the substrate.

In some embodiments, the dielectric layer, the protective layer in contact with the metallic IR reflective layer, and the metallic IR reflective layer are introduced onto the substrate by magnetron sputtering deposition. In some further embodiments, the dielectric layer of $TiO_2$ is deposited onto the substrate by sputtering Ti under 400 sccm of Ar and 35 sccm of $O_2$ at a working pressure of 0.00595 mbar, the protective layer of NiCr is deposited onto the dielectric layer of $TiO_2$ by sputtering NiCr (80 wt % Ni, 20 wt % Cr) under 400 sccm of Ar at a working pressure of 0.00369 mbar, and the Ag metallic IR reflective layer is deposited onto the protective layer of NiCr by sputtering Ag under 400 sccm of Ar at a working pressure of 0.00369 mbar. In even further embodiments, the dielectric/adhesive layer of $SiO_2$ or Al-doped $SiO_2$ is deposited onto the dielectric layer of $TiO_2$ by sputtering Si or 5 wt % Al doped Si under 400 sccm of Ar and 45 sccm of $O_2$ at a working pressure of $5.1\times10^{-3}$ mbar.

According to a third aspect, there is provided a use of the coated article according to the first aspect or prepared according to the second aspect in automotive vehicles or buildings.

BRIEF DESCRIPTION OF DRAWINGS

Embodiments of the present invention will be discussed with reference to the accompanying drawings wherein:

FIG. 3 depicts application of a pulse laser beam to form a selective frequency surface on an Ag layer with different periodic patterns, wherein the darker area shows Ag coating, the bright area shows ablated line, D=diagonal length, and w=linewidth.

FIG. 4 shows photographs of the coated article of FIG. 1 before and after Bayer and Steel wool tests.

FIG. 5 shows low-E coating a) without hard coat after 24 hours in the salt spray tester, b) with hard coat after 1000 hours in the salt spray test.

FIG. 6 shows a) and b) photographs of laser etched 20 nm of Ag with the hexagonal pattern, and c) SEM image of the hexagonal pattern. Darkest areas correspond to ablated laser path.

DESCRIPTION OF EMBODIMENTS

Figure 1:
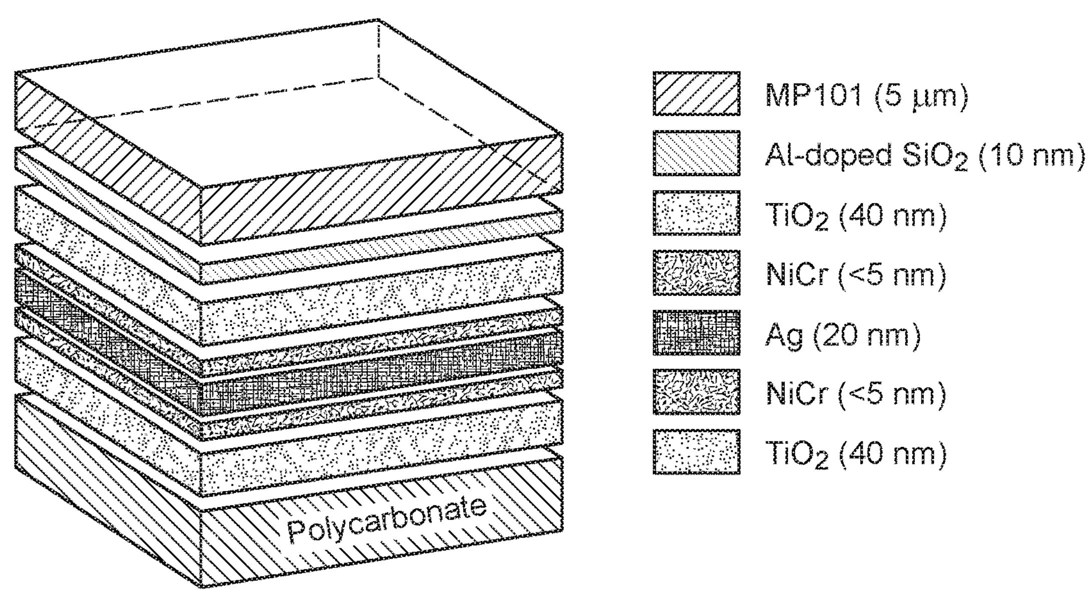
FIG. 1 shows an illustrative embodiment of a coated article comprising a simple, cost-effective and durable low-E coating supported by a polycarbonate substrate (0.4 cm) in accordance with the present disclosure.

Aspects of the present disclosure arise from the inventors' research on a multifunctional coated article which may have a simple structure and are durable, visibly transparent, capable of reflecting thermal energy, efficient for 5G communications, as well as abrasion and weathering resistant. The coated article can be widely applied in, for example, automotive vehicles and buildings, such as in glazed windows for energy saving and efficient signal transmission.

The term "low emissivity (low-E)" used herein refers to a surface condition that emits low levels of radiant thermal energy and may have an emissivity value about $0.04<\varepsilon<$about 0.4. This & implies the coated article may reflect at least about 60% up to about 96% of ultraviolet and infrared light that is incident on it.

The term "IR reflecting" used herein means capable of reflecting infrared (IR) radiation, especially near and medium IR radiation.

The term "telecommunication frequency" used herein includes, but is not limited to, signals from about 600 MHz up to about 100 GHz, especially those for 5G communication, which allow for larger bandwidth, high data rates, lower latency and increased capacity on the network.

The term "frequency selective surface (FSS)" refers to a periodic resonant pattern designed on a coating that selectively allows or prevents the transmission of electromagnetic waves. For the present purpose, the frequency selective surface is particularly used to reduce attenuation of telecommunication frequency signal transmission.

The term "unit cell" with respect to a frequency selective surface used herein refers to a basic shape that forms a periodic pattern.

The terms "oxide", "nitride" and "oxy-nitride" as used herein include various stoichiometries and, unless specified otherwise, includes all possible stoichiometries.

The symbol "x" or "y" in a chemical formula for a compound disclosed herein denotes the number of atoms of the element in question.

Disclosed herein is a coated article comprising a low-E coating supported by a substrate, wherein the low-E coating comprises a metallic IR reflective layer, a protective layer in contact with the metallic IR reflective layer, and a dielectric layer. The composition of the coated article disclosed can be chosen to make it transparent, and this may be desirable in the automotive, transportation or architectural industry.

For the present purpose, the coated article comprising the low-E coating may have a thermal emissivity ε of about $0.04<\varepsilon<$about 0.4. Furthermore, the coated article may have a visible transmittance of >about 60%, preferably >about 70%, more preferably >about 80% and/or have an IR reflectance of >about 60%, preferably >about 70%. The low-E coating may be in a total thickness of about 90 nm to about 120 nm, for example 110 nm. The transmittance (% T) and reflectance (% R) are measured by a Cary 5000 spectrophotometer (Agilent Technologies) between 380 nm and 3300 nm. The visible solar weighted transmittance (% $T_{VIS}$) and IR solar weighted reflectance (% $R_{IR}$) were calculated as per eq. 1 and 2, respectively.

$$\% T_{VIS} = \frac{\int_{380}^{780} (\% T \cdot I d\lambda)}{\int I d\lambda} \cdot 100 \quad (1)$$

$$\% R_{IR} = \frac{\int_{781}^{3300} (\% R \cdot I d\lambda)}{\int I d\lambda} \cdot 100 \quad (2)$$

Where I is the solar irradiance and di is the wavelength interval of integration.

The low-E coating disclosed herein can be directly or indirectly applied onto various substrates, which may be substantially made from plastic or glass. When the coated article is to be used as a window for buildings or vehicles, the substrate may preferably be transparent and have desirable optical qualities and impact resistance. The substrate may be coloured (e.g. green, grey or blue). The plastic substrate to be used may be rigid or flexible. For example, the low-E coating disclosed herein may be applied onto a flexible plastic substrate for window tints. Examples of suitable plastic substrates include, but are not limited to, polycarbonate, polyethylene, polypropylene, ploymethylmethacrylate, polystyrene, polyamide, polyester, polyestercarbonate, polyethersulfone, polyethylene terephthalate (PET), polyethylene naphthalate (PEN), polyethylene terephthalate glycol (PETG), acrylonitrile butadiene styrene (ABS), acrylonitrile styrene acrylate (ASA), polymethyl methacrylate (PMMA) and polyetherimide. Examples of glass substrates include, but are not limited to, borosilicate glass, flat glass, quartz glass, and soda lime (float) glass. Although a rigid glass substrate is well known, it is also possible for the glass substrate to be flexible, for example the Corning® Willow® Glass from Corning Inc., Corning, USA. Polycarbonate is a very robust plastic and naturally transparent, and may be a preferable option to replace glass. A suitable example is Makrolon® AR polycarbonate, which is commercially available from Covestro Group. The substrate to be used varies in thickness and may be about 0.4 cm to 0.5 cm thick.

It will be appreciated that the low-E coating may be coated on one side or two sides of the substrate. In certain embodiments, for a double glazed window, the low-E coating is applied on the inner side of each glazing pane. The coated article comprising the low-E coating and the hard coat disclosed herein advantageously has high abrasion and corrosion resistance, which in turn enables the low-E coating to be applied onto at least part of a surface of the substrate that will be exposed to a use environment and removes the need for it to be placed in between window panes. In other words, the coated article can have no between-pane space. The low-E coating reduces the amount of solar heat that passes through the coated article (for example, the window) to keep the inside cooler without compromising the amount of visible light that is transmitted. When the interior heat energy tries to escape to the colder outside during winter, the low-E coating reflects the heat back to the inside, thereby reducing radiant heat loss through the coated article. Methods known in the art can be used to apply one or more layers within the low-E coating onto the substrate. An example of the methods is physical vapor deposition (PVD), which includes, but is not limited to, magnetron sputtering, e-beam evaporation and thermal evaporation.

The low-E coating comprises one or more metallic IR reflective layer. Generally, the metallic IR reflective layers may comprise or consist of any reflective metal, such as silver (Ag), aluminium (Al), copper (Cu), zinc (Zn), niobium (Nb), titanium nitride (TiN), Ag/Au alloys, Ag/Cu alloys, Ag/Al alloys, $NbN_x$, NbCr, $NbCrN_x$, $NbZrO_x$, and/or gold (Au). Preferably, silver (Ag) is utilised for the metallic IR reflective layer(s) due to its relatively neutral colour. The thickness of the metallic IR reflective layer can be selected to achieve the desired reflection and visible transmittance of IR radiation. On one hand, the reflective layer is expected to be thin enough to allow visible light through to provide good transmittance. On the other hand, the emissivity of a metallic IR reflective layer (such as Ag layer) tends to decrease with decreasing the sheet resistance. Thus, to obtain a low emissivity, the sheet resistance of the IR reflective layer(s) (such as Ag layer) should be as low as possible, which means as thick as possible in thickness. A thicker IR reflective layer may be beneficial for thermal performance, but it could lead to higher costs and longer time for fabricating the metallic IR reflective layer. In use, the thickness of the IR reflective layer may be from about 5 nm to about 25 nm, more preferably about 10 nm to about 20 nm. If desirable, two or three metallic IR reflective layers can be used. These are called double or triple reflective low-E coatings. The more reflective layers (e.g. Ag layers), the higher is the visible transmittance and the IR reflectance.

The metallic IR reflective layer can be applied using methods known in the art, which include, but are not limited to, magnetron sputtering deposition and pyrolytic processes. In certain embodiments, an IR reflective layer may be sputtered (for example at about 3000 W) onto a protective layer or a dielectric layer over the substrate from a cathode of a required metal in an inert atmosphere. An IR reflective layer fabricated through magnetron sputtering deposition generally performs better than the one fabricated through pyrolytic process in terms of solar control and the reduction of heat transfer through windows.

Various protective layers can be applied onto each metallic IR reflective layer to provide the latter with immediate protection, for example, against attack of the plasma when sputtering the dielectric layer(s) on top of it, or from the diffusion of aggressive species like $O_2$, O, $H_2O$, and $Na^+$. It is also desirable for the protective layer to have good adhesion to the metallic IR reflective layer and allow satisfactory transmission of visible light. A metal, an alloy, a silicide, a nitride or any other suitable material that achieves the desired effect could be used. For example, the protective layer may comprise or consist of, without limitation, nickel-chromium alloys (NiCr), $NiCrO_x$, $NiCrN_x$, $NiCrO_xN_y$, $Ni_x$-$Ti_yO_z$, Ni, Cr, $CrN_x$, $NiO_x$, Ti, $TiO_x$, $NbO_x$, ZnO, $Al_2O_3$, $ZnAlO_x$ or any combination thereof. The nickel-chromium alloys (NiCr) include, but are not limited to NiCr (80/20 wt. %), NiCr (70/30 wt. %), NiCr (60/40 wt. %) and NiCr (50/50 wt. %). In some situations, the protective layer may also serve as an adhesion and/or nucleation layer. With respect to all embodiments herein, each protective layer may be of a thickness in the range from about 1 nm to about 5 nm, preferably about 1 nm to about 3 nm or about 2 nm to about 3 nm. A thicker protective layer may contribute to durability. If the protective layer is too thin, it is likely to be uncontinuous and not be able to cover the metallic IR reflective layer, and therefore it will be ineffective in providing sufficient protection. In some embodiments, it is preferable to have a protective layer on each side of the IR reflective layer. However, the presence of a protection layer only on one side of the IR reflective layer is possible. In a preferable embodiment, the protective layer comprises NiCr. More preferably, a protective layer consisting of NiCr is provided on each side of the IR reflective layer.

Known methods, for example, sputtering deposition and thermal evaporation, can be used to apply the protective layer on the substrate. When a protective layer of NiCr is employed, the protective layer is preferably sputtered on the metallic IR reflective layer (for example at about 700 W) and deposited from for example DC (direct current) targets. When a protective layer of ZnO is employed, the protective layer can be fabricated by arc plasma deposition with an evaporated zinc source, using a plasma containing a stoichiometric excess of oxygen.

A dielectric layer in the low-E coating performs anti-reflection functions and increases transmission of the overall coated article. It also provides protection to the layer(s) underneath. If needed, the low-E coating may comprise one or more dielectric layer. In some embodiments, a succession of two or more dielectric layers is used.

There is no specific limitation on the dielectric material(s) to be used for the dielectric layer. Most of the commonly used dielectric materials may be considered for the purpose of the present disclosure, for example, an oxide, a nitride, an oxy-nitride, or a combination thereof. It is also possible for the dielectric material to be doped with suitable materials, such as, Al or stainless steel. Factors including refractive index n, region of transparency, the availability of a deposition method and cost-effectiveness may be considered in choosing a suitable dielectric material. Other considerations such as compatibilities with other materials and thermal stability may also be decisive. Materials suitable for a dielectric layer include $TiO_2$, $Ta_2O_5$, $Nb_2O_5$, $ZrO_2$, ZnO, ZnS, ZnSe, $HfO_2$, $LaTiO_3$, $Al_2O_3$, $La_2O_3$, $Y_2O_3$, $Gd_2O_3$, $Sc_2O_3$, $Si_3N_4$, and $SiAlO_xN_y$ and may comprise one or more selected from $SiO_2$, Al-doped $SiO_2$, LiF, $MgF_2$, $Na_3AlF_6$, $SnO_2$, indium tin oxide (ITO), Al-doped zinc oxide (AZO), $WO_3$, $SiO_xN_y$. For the purpose of high transmittance and refractive index, the protective layer preferably comprises or consists of $TiO_2$, $Nb_2O_5$, and/or $Ta_2O_5$. If desirable, a dielectric layer of $SiO_2$ or Al-doped $SiO_2$ may also function as an adhesive layer.

In general, the thickness of each of the dielectric layers is tuned to reduce inside and outside reflectance so that the light transmittance is high, for example, >about 60%. The thickness of each of the dielectric layers may vary from about 25 nm to about 45 nm. However, it is recommended that the thickness of each of the dielectric layers over the IR reflective layer is in the range of from about 30 nm to about 40 nm.

A dielectric layer used herein can be deposited by methods known in the art, such as radio frequency magnetron sputtering, direct current magnetron sputtering, reactive pulsed magnetron sputtering, thermal evaporation, electron-beam evaporation, ion-beam sputtering, and atomic layer deposition. The choice of the deposition method may depend upon the deposited material and the expected optical properties. In some embodiments, when a dielectric layer comprising $TiO_2$ and/or a dielectric layer comprising $SiO_2$ are to be deposited, magnetron sputtering is adopted (for example at about 3000 W or 3800 W for $TiO_2$, and at about 2000 W for $SiO_2$) and the layers are prepared by sputtering Ti or Si target in oxygen.

In some embodiments, a metallic IR reflective layer is sandwiched between two adjacent protective layers, each of the protective layers comprises or consists of NiCr and is about <5 nm thick, the metallic IR reflective layer comprises or consists of Ag and is about 20 nm thick.

In some embodiments, the coated article disclosed herein comprises a low-E coating supported by a substrate, and the low-E coating comprises, in order outward from the substrate, a dielectric layer comprising or consisting of $TiO_2$, a protective layer comprising or consisting of NiCr, a metallic IR reflective layer comprising or consisting of Ag, a protective layer comprising or consisting of NiCr, and a dielectric layer comprising or consisting of $TiO_2$. If needed, a dielectric/adhesive layer comprising or consisting of $SiO_2$ or Al-doped $SiO_2$ is added onto the dielectric layer comprising or consisting of $TiO_2$ which is further outward from the substrate.

More specifically, the coated article comprises a low-E coating supported by a substrate, and the low-E coating may comprise, in order outward from the substrate, a dielectric layer of $TiO_2$ that is about 25 nm to about 45 nm, a protective layer of NiCr that is about <5 nm, a metallic IR reflective layer of Ag that is about 10 nm to about 20 nm, a protective layer of NiCr that is about <5 nm, and a dielectric layer of $TiO_2$ that is about 25 nm to about 45 nm. In even further embodiments, the coated article comprises a low-E coating supported by a substrate, and the low-E coating comprises, in order outward from the substrate, a dielectric layer of $TiO_2$ that is about 40 nm, a protective layer of NiCr (80/20) that is about <5 nm, a metallic IR reflective layer of Ag that is about 20 nm, a protective layer of NiCr (80/20) that is about <5 nm, and a dielectric layer of $TiO_2$ that is about 40 nm. In even further embodiments, the coated article comprises a low-E coating directly supported by a substrate, and the low-E coating comprises or consists of, in order outward from the substrate, a dielectric layer of $TiO_2$ that is about 40 nm, a protective layer of NiCr (80/20) that is about <5 nm, a metallic IR reflective layer of Ag that is about 20 nm, a protective layer of NiCr (80/20) that is about <5 nm, a dielectric layer of $TiO_2$ that is about 40 nm, and a dielectric/adhesive layer of $SiO_2$ or Al-doped $SiO_2$ that is about 10 nm.

A frequency selective surface on the metallic IR reflective layer is used to enhance the transmission of telecommunication frequencies through the coated article. The frequency selective surface may have a periodic pattern, such as a periodic triangular lattice, a periodic square lattice, a periodic hexagonal lattice, a periodic circular lattice, or a periodic Kagome lattice (see FIG. 3). In addition or alternatively, the frequency selective surface may have an aperiodic pattern such as a penrose tiling. The frequency selective properties can be tuned by changing the geometrical shape and the geometrical parameters (such as the unit cell dimension and the aperture line width) of the periodic pattern so as to achieve desirable signal transmission at a particular operating frequency. The frequency selective surface used for the present purpose could advantageously reduce the attenuation of the signal transmission of telecommunication frequencies from about 30 dB to about 1 dB when compared with a coated article wherein the metallic IR reflective layer bears no frequency selective surface.

The unit cell dimension used herein refers to a dimension of the unit cell that reflects the periodicity and the aperture line width means the width of an ablated path. Taking a periodic hexagonal lattice as an example, the unit cell dimension is denoted by the length of a diagonal (see, for example, FIG. 2). For a periodic square lattice, the unit cell dimension is denoted by the diagonal of the square. For a periodic ring lattice, the unit cell dimension is denoted by a diameter. Preferably, the aperture line width is small enough so that the optical contrast is not visible to the naked eye.

The frequency selective surface can be fabricated by laser etching. If needed, a laser-scribed grid can be utilised in the fabrication. For the purpose of illustration, a stack of a substrate/a dielectric layer/a protective layer/a metallic IR reflective layer/a protective layer is etched by pulsed Nd:YAG laser before growing other layer(s) such as another dielectric layer and an outermost hard coat over the protective layer. In some embodiments, a stack of a substrate/a dielectric layer/a protective layer/a metallic IR reflective layer is laser etched to create a frequency selective surface. The laser parameters can be optimised to etch just the metallic IR layer without reaching the substrate. Alternatively, photolithography may be considered to create the frequency selective surface. By ablating only a small percentage in area of the IR reflective layer (for example 5% to 10% of the layer surface area), the thermal heat reflectance properties and the high transmittance of the coated article are preserved while allowing telecommunication frequencies to pass through.

In some embodiments, the periodic pattern of the frequency selective surface has a unit cell dimension of less than about 2 mm, for example less than 1 mm, and an aperture line width of about 30 μm to about 60 μm, for example 50 μm. In a preferable embodiment, the periodic pattern of the frequency selective surface is a periodic hexagonal lattice. More preferably, the diagonal of the hexagon is about 0.5 mm and the aperture line width is about 50 μm.

It has been found by the present inventors that a hard coat can be provided as an outermost layer to protect the layers underneath so as to improve durability (especially in terms of the abrasion resistance and weathering resistance) of the coated article. This in turn enables the coated article to be applied in automotive, medical and architecture applications. To this end, a variety of abrasion resistant hard coats based on polysiloxane may be considered, and they may typically be applied at a thickness of about 5 μm to about 6 μm. In some embodiments, the polysiloxane-based abrasion resistant hard coat can be prepared from a thermally curable, liquid polysiloxane nanocomposite hard coat resin containing silica nanoparticles, such as CRYSTALCOAT™ MP-101 commercially available from SDC TECHNOLOGIES ASIA PACIFIC, PTE. LTD. If needed, an adhesive layer may be applied onto the low-E coating before applying the hard coat and the adhesive layer can be made from materials known in the art, for example, $SiO_2$ or Al-doped $SiO_2$. If an adhesive layer of $SiO_2$ or Al-doped $SiO_2$ is adopted, the thickness of the adhesive layer can be about 10 nm to about 100 nm, preferably about 10 nm. A dip coating method or a flow coating method can be used to apply a polysiloxane based hard coat. For a dip coating, the substrate receives the coating prior to being thermally cured.

When there is no hard coat, the coated article comprising the low-E coating can be placed in the cavities of multiple pane windows so as to be isolated from the atmosphere.

Other layer(s) may also be present for the coated article disclosed herein. In some circumstances, instead of a hard coat, the coated article comprises an overcoat for example made from $SiO_2$ as the outmost layer to realise improved durability.

In some circumstances, the coated article according to the present disclosure may allow 5G signals to pass through while effectively reflecting infrared light or thermal heat and being highly transparent, which makes it useful in windows for public transportation and buildings etc. It may also have a simplified design (in particular having as few as five to seven coating layers in some circumstances) compared to existing commercial products. It may enable the low-E coating to be applied onto at least part of a surface of the substrate that will be exposed to a use environment (i.e. facing the atmosphere) and removes the need for it to be placed in between panes.

EXAMPLES

Fabrication of a Coated Polycarbonate Substrate with a Low-E Coating

A coated polycarbonate as shown in FIG. 1 is prepared in the following way.

Makrolon AR polycarbonate (PC) substrates have been washed with detergent and a non-abrasive sponge, dried with compressed air and plasma cleaned in an Ar atmosphere for 2 minutes.

The deposition of $TiO_2$, NiCr, Ag and Al-doped $SiO_2$ was performed by means of a custom-made in-line magnetron sputtering system. The system uses high purity tubular sputtering targets (80 cm in height and 7.5 cm in diameter) that rotate during the deposition: Ti (99.99 wt % pure) NiCr (80 wt % Ni, 20 wt % Cr), Si (Al doped 5 wt %) and Ag (99.99 wt % pure). The pressure prior to deposition was $1.5\times10^{-6}$ mbar and each target was pre-sputtered during 4 minutes.

Firstly, 40 nm of $TiO_2$ were deposited in poison mode using 400 sccm of Ar and 35 sccm of $O_2$ which gave a working pressure of 0.00595 mbar. The sputtering power was kept at 3800 W and the speed of the carrier was 1.04 mm/second.

Then, less than 5 nm of NiCr were deposited at 700 W at a working pressure of 0.00369 mbar (400 sccm of Ar) and at a carrier speed of 39.4 mm/second.

On top of NiCr, Ag (20 nm) was sputtered at 3000 W at the same working pressure, 0.00369 mbar, and carrier speed of 21.4 mm/second.

Again, NiCr (<5 nm) and then $TiO_2$ (40 nm) were grown on top of the patterned Ag, using previously defined conditions. 10 nm of Al-doped $SiO_2$ was deposited also in poison mode, at 2000 W, using 400 sccm of Ar and 45 sccm of $O_2$ which resulted in a working pressure of $5.1\times10^{-3}$ mbar. The speed of the carrier was 16.4 mm/second.

And finally, a Qualtech QPI-168 dip coater was used to dip-coat the stacks with a transparent hard coat resin, CrystalCoat MP101 (SDC Technologies, solid content 32.5%) consisting of a siloxane matrix with embedded silica nanoparticles. An immersion rate of 500 mm/min was used, which resulted in a hard coat thickness of 5 μm. After the immersion, the samples were allowed to dry for 30 minutes and then cured in an oven at 130° C. for 1 hour. This process was performed at a humidity of 25-45%.

Figure 8:
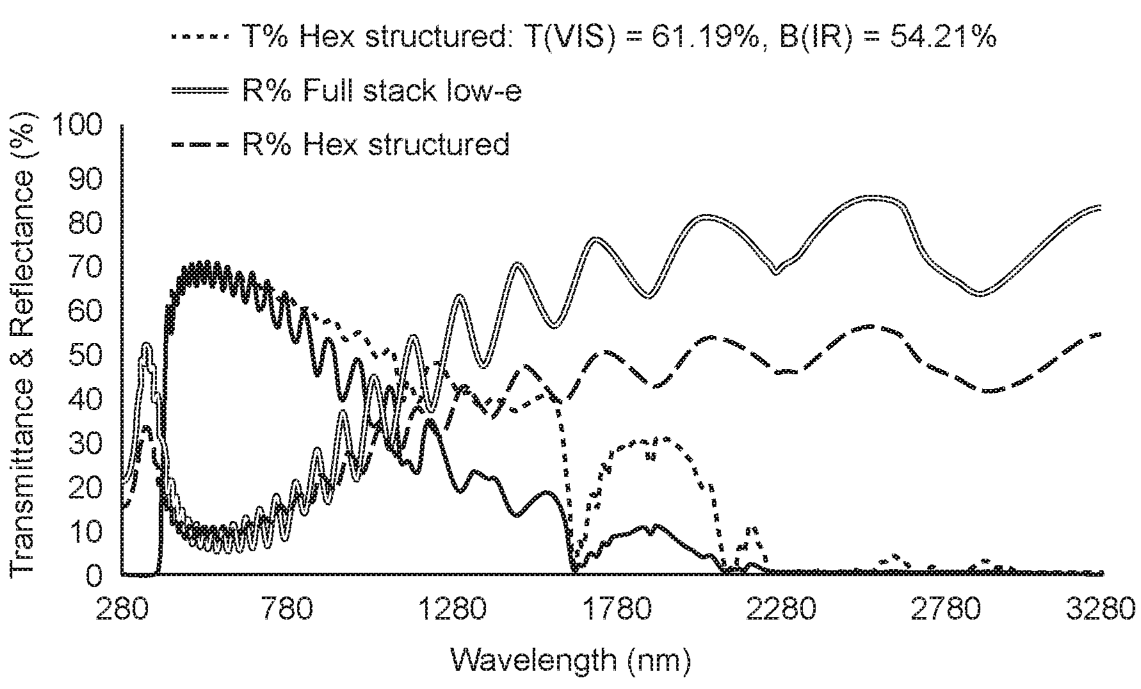
FIG. 8 shows transmittance and reflectance spectra of the full low-E coating with and without laser etching.

FIG. 8 shows that the resultant low-E coating has a visible transmittance of about 61% and an IR reflectance of about 64%. Compared to some commercial low-E coatings, the low-E coating prepared herein not only has a simple low-cost structure but also demonstrates a comparable transmittance of visible light and a comparable reflectivity of IR radiation. The visible transmittance and the IR reflectance were analysed using a UV-VIS-NIR spectrophotometer (Cary 5000) from Agilent Technologies Inc.

Durability-Abrasion and Corrosion of the Coated Article Prepared Above

Abrasion tests such as Bayer and Steel Wool tests were performed on the low-E samples. The Steel Wool test was conducted by a Sutherland® 2000™ Rub Tester from Danilee Co. In the Bayer test, a TABER® Oscillating Abrasion Tester (Model 6100) was used to assess abrasion resistance to fine gravel. In these tests, the higher is the abrasion ratio, the more resistant is the sample. Both tests confirmed the suitability of the coated article as first surface windows due to its high abrasion resistance (FIG. 4). Almost no visual changes were observed after the tests.

| | Bayer | Steel wool |
|---|---|---|
| ΔT(VIS)/% | 4.84 | −0.93* |
| $\text{Ratio} = \frac{\Delta\text{ Haze Bare } PC}{\Delta\text{ Haze } UniSA \text{ sample}}$ | 6.26 | 18.29 |

The low-E stack was placed 1000 hours inside a corrosion chamber. After 1000 hours (time required for commercial automotive side mirrors), the low-E coating had barely changed its appearance and resulted in the same transmittance values. FIG. 5*a*) shows the result of the unprotected stack (without hard coat) after 24 hours inside the corrosion chamber and of the protected stack after 1000 hours.

Fabrication of a Coated Polycarbonate Substrate with a low-E Coating Having a Frequency Selective Surface on the Metallic IR Reflective Layer Makrolon AR polycarbonate (PC) substrates have been washed with detergent and a non-abrasive sponge, dried with compressed air and plasma cleaned in an Ar atmosphere for 2 minutes.

The deposition of $TiO_2$, NiCr, Ag and Al-doped $SiO_2$ was performed by means of a custom-made in-line magnetron sputtering system. The system uses high purity tubular sputtering targets (80 cm in height and 7.5 cm in diameter) that rotate during the deposition: Ti (99.99 wt % pure) NiCr (80 wt % Ni, 20 wt % Cr), Si (Al doped 5 wt %) and Ag 99.99 wt % pure). The pressure prior to deposition was $1.5\times10^{-6}$ mbar and each target was pre-sputtered during 4 minutes.

Firstly, 40 nm of $TiO_2$ were deposited in poison mode using 400 sccm of Ar and 35 sccm of $O_2$ which gave a working pressure of 0.00595 mbar. The sputtering power was kept at 3800 W and the speed of the carrier was 1.04 mm/second.

Then, less than 5 nm of NiCr were deposited at 700 W at a working pressure of 0.00369 mbar (400 sccm of Ar) and at a carrier speed of 39.4 mm/second.

On top of NiCr, Ag (20 nm) was sputtered at 3000 W at the same working pressure, 0.00369 mbar, and carrier speed of 21.4 mm/second.

The frequency selective surface (FSS) is first designed by means of AutoCAD. The pattern designs are saved as a drawing exchange format (DXF) file and then transferred to the laser ablation equipment. The periodic FSS hexagonal patterns (unit cell 0.5 mm) are ablated and evaporated from the Ag thin films by a Nd:YAG (1064 nm) pulsed laser, G8 from Sei Laser. The patterns are etched at a frequency of 10 kHz with a speed of 100 mm/second and at a power of 18 W. These parameters produce an ablated linewidth of 50 μm. An extraction system is attached to the machine to remove fumes from the evaporation process.

Again, NiCr (<5 nm) and then $TiO_2$ (40 nm) were grown on top of the patterned Ag, using previously defined conditions.

10 nm of Al-doped $SiO_2$ were deposited also in poison mode, at 2000 W, using 400 sccm of Ar and 45 sccm of $O_2$ which resulted in a working pressure of $5.1\times10^{-3}$ mbar. The speed of the carrier was 16.4 mm/second.

And finally, a Qualtech QPI-168 dip coater was used to dip-coat the stacks with a transparent hard coat resin, CrystalCoat MP101 (SDC Technologies, solid content 32.5%) consisting of a siloxane matrix with embedded silica nanoparticles. An immersion rate of 500 mm/minute was used, which resulted in a hard coat thickness of 5 μm. After the immersion, the samples were allowed to dry for 30 minutes and then cured in an oven at 130° C. for 1 hour. This process was performed at a humidity of 25-45%.

Figure 7:
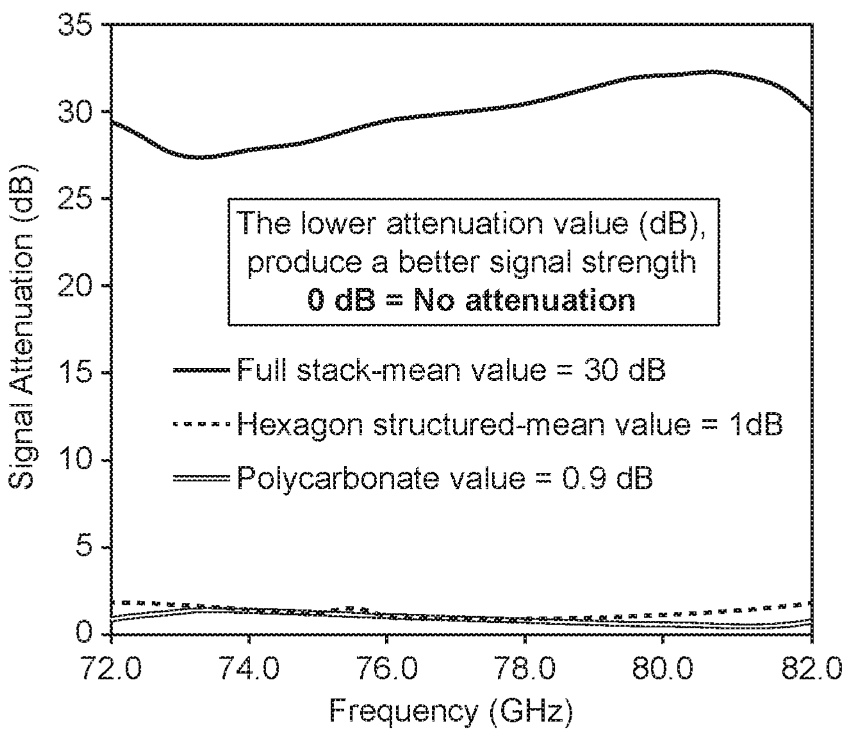
FIG. 7 shows signal transmission in the automotive frequency range at 72 GHz to 82 GHz.

Characterisation of a Coated Polycarbonate Substrate with a low-E Coating Having a Frequency Selective Surface on the Metallic IR Reflective Layer FIG. 7 and the table below provide characters of the coated article having a frequency selective surface and make comparison with plain polycarbonate and the coated article without a frequency selective surface.

| Sample | One way attenuation (mean value 76-81 GHz) | Infrared blocking (%) | Visible light transmission (%) |
|---|---|---|---|
| Plain Polycarbonate | 0.9 dB | 18 | 87 |
| Full stack | 30 dB | 64 | 61 |
| Full stack + Hexagon structured (size = 0.5 mm, linewidth = 50 μm) | 1 dB | 54 | 62 |

Figure 2:
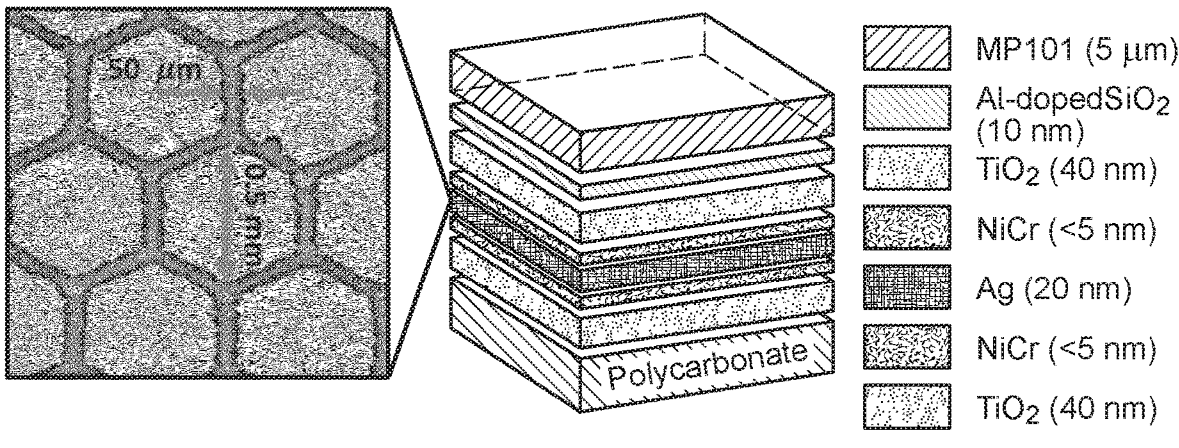
FIG. 2 depicts a layer-by-layer structure of a coated article in accordance with the present disclosure, wherein the substrate/$TiO_2$/NiCr/Ag/NiCr has been laser etched with a honeycomb pattern.

The FSS technique has also been applied to the fully grown low-E coating (FIG. 2). $TiO_2$/NiCr/Ag/NiCr films have been laser etched with the hexagonal pattern before growing top $TiO_2$, Al-doped $SiO_2$ and the hard coat. The transmittance of the resultant low-E coating has barely changed and the blocked IR light has just decreased by 10% (FIG. 8).

The reference to any prior art in this specification is not, and should not be taken as, an acknowledgement or any form of suggestion that such prior art forms part of the common general knowledge.

It will be understood that the terms "comprise" and "include" and any of their derivatives (e.g. comprises, comprising, includes, including) as used in this specification, and the claims that follow, is to be taken to be inclusive of features to which the term refers, and is not meant to exclude the presence of any additional features unless otherwise stated or implied.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A coated article comprising a low-E coating supported by a substrate, wherein the low-E coating comprises a metallic IR reflective layer, a protective layer in contact with the metallic IR reflective layer, a dielectric layer, and a hard coat as the outermost layer, and wherein the metallic IR reflective layer is sandwiched between only two adjacent protective layers.

2. The coated article according to claim 1, wherein the coated article has a visible transmittance of >about 60% and/or a visible reflectance of >about 60%.

3. The coated article according to claim 1, wherein the low-E coating supported by the substrate has a total thickness in the range of about 90 nm to about 120 nm.

4. The coated article according to claim 1, wherein the metallic IR reflective layer comprises Ag, Al, Cu, Zn, Nb, TiN, Ag/Au alloys, Ag/Cu alloys, Ag/Al alloys, $NbN_x$, NbCr, $NbCrN_x$, $NbZrO_x$, and/or Au.

5. The coated article according to claim 1, wherein the low-E coating comprises one metallic IR reflective layer.

6. The coated article according to claim 5, wherein the metallic IR reflective layer has a thickness of about 5 nm to about 25 nm.

7. The coated article according to claim 1, wherein the protective layer in contact with the metallic IR reflective layer comprises one or more selected from the group consisting of nickel-chromium alloys (NiCr), $NiCrO_x$, $NiCrN_x$, $NiCrO_xN_y$, $Ni_xTi_yO_z$, Ni, Cr, $CrN_x$, $NiO_x$, Ti, $TiO_x$, $NbO_x$, ZnO, $Al_2O_3$, and $ZnAlO_x$.

8. The coated article according to claim 7, wherein the protective layer has a thickness of about 1 nm to about 5 nm.

9. The coated article according to claim 1, wherein the low-E coating comprises one or more dielectric layers.

10. The coated article according to claim 9, wherein each of the dielectric layers has a thickness of from about 10 nm to about 45 nm.

11. The coated article according to claim 1, wherein the dielectric layer comprises one or more selected from the group consisting of $TiO_2$, $Ta_2O_5$, $Nb_2O_5$, $ZrO_2$, ZnO, ZnS, ZnSe, $HfO_2$, $LaTiO_3$, $Al_2O_3$, $La_2O_3$, $Y_2O_3$, $Gd_2O_3$, $Sc_2O_3$, $Si_3N_4$, $SiO_2$, LiF, $MgF_2$, $Na_3AlF_6$, $SnO_2$, indium tin oxide (ITO), Al-doped $SiO_2$, Al-doped zinc oxide (AZO), $WO_3$, $SiAlO_xN_y$, and $SiO_xN_y$.

12. The coated article according to claim 1, wherein a metallic IR reflective layer is sandwiched between two adjacent protective layers, each of the protective layers comprises NiCr and is about <5 nm thick, the metallic IR reflective layer comprises Ag and is about 20 nm thick.

13. The coated article according to claim 1, wherein the coated article comprises a low-E coating supported by a substrate, and the low-E coating comprises, in order outward from the substrate, a dielectric layer comprising $TiO_2$, a protective layer comprising NiCr, a metallic IR reflective layer comprising Ag, a protective layer comprising NiCr, and a dielectric layer comprising $TiO_2$.

14. The coated article according to claim 13, wherein the coated article comprises a low-E coating supported by a substrate, and the low-E coating comprises, in order outward from the substrate, a dielectric layer of $TiO_2$ in about 25 nm to about 45 nm, a protective layer of NiCr in about <5 nm, a metallic IR reflective layer of Ag in about 10 nm to about 20 nm, a protective layer of NiCr in about <5 nm, and a dielectric layer of $TiO_2$ in about 25 nm to about 45 nm.

15. The coated article according to claim 14, wherein the coated article comprises a low-E coating supported by a substrate, and the low-E coating comprises, in order outward from the substrate, a dielectric layer of $TiO_2$ in about 40 nm, a protective layer of NiCr in about <5 nm, a metallic IR reflective layer of Ag in about 20 nm, a protective layer of NiCr in about <5 nm, and a dielectric layer of $TiO_2$ in about 40 nm.

16. The coated article according to claim 1, wherein the metallic IR reflective layer comprises a frequency selective surface configured to reduce attenuation of telecommunication frequency signal transmission.

17. The coated article according to claim 1, wherein the substrate for the coated article is substantially made from plastic or glass.

18. A method for preparing the coated article according to claim 1, which includes introducing the dielectric layer, the protective layer in contact with the metallic IR reflective layer, the metallic IR reflective layer, and the hard coat as the outermost layer onto the substrate.

19. The method according to claim 18, wherein the dielectric layer, the protective layer in contact with the metallic IR reflective layer, the metallic IR reflective layer, and the hard coat as the outermost layer are introduced onto the substrate by magnetron sputtering deposition.

* * * * *